United States Patent

Chaney, Jr. et al.

[11] Patent Number: 5,114,808
[45] Date of Patent: May 19, 1992

[54] CELL COVER WITH INTERNAL COMPRESSION RING OF HIGH YIELD STRENGTH MATERIAL

[75] Inventors: Earl J. Chaney, Jr., Medina; Theodore P. Dziak, Fairview Park, both of Ohio

[73] Assignee: Eveready Battery Company, Inc., St. Louis, Mo.

[21] Appl. No.: 519,583

[22] Filed: May 7, 1990

[51] Int. Cl.⁵ .............................................. H01M 2/12
[52] U.S. Cl. ...................................... 429/172; 424/56; 424/174; 424/185
[58] Field of Search ................... 429/56, 172, 174, 185

[56] References Cited

U.S. PATENT DOCUMENTS

| | | |
|---|---|---|
| 3,185,595 | 5/1965 | Schenk . |
| 3,754,997 | 8/1973 | Ralston ............................. 429/172 |
| 4,374,909 | 2/1983 | Tucholski ......................... 429/174 |
| 4,419,420 | 12/1983 | Ishizaki ............................ 429/185 |
| 4,452,062 | 6/1984 | Ishizaki ............................ 72/348 |
| 4,725,512 | 2/1988 | Jurca ................................ 429/174 |
| 4,931,368 | 6/1990 | Ayers et al. ..................... 429/56 |

FOREIGN PATENT DOCUMENTS

| | | |
|---|---|---|
| 0115733 | 9/1975 | Japan . |
| 0049857 | 4/1980 | Japan . |
| 0101338 | 6/1982 | Japan . |
| 1502179 | 2/1978 | United Kingdom ............... 429/174 |

Primary Examiner—Brian E. Hearn
Assistant Examiner—Maria Nuzzolillo
Attorney, Agent, or Firm—Robert W. Welsh

[57] ABSTRACT

An electrochemical cell having a cold worked, complexly configurated and subsequently annealed cover over an open end of the cell housing, the cell cover incorporating a compression ring of high yield strength in radially outwardly compressive engagement with the inner face of a rim of the cover to compress the rim against a seal between the rim and the cell housing.

13 Claims, 1 Drawing Sheet

CELL COVER WITH INTERNAL COMPRESSION RING OF HIGH YIELD STRENGTH MATERIAL

BACKGROUND OF THE INVENTION

This invention relates to electrochemical cells, and particularly to such cells having a complex cover formed by being highly cold worked into the special configuration.

Cells of the type in U.S. patent application Ser. No. 102,814, now U.S. Pat. No. 4,931,368 assigned to the assignee herein, employ a complexly configured cell cover which is highly cold worked in its formation The center of the cover preferably is specially configured to incorporate a safety vent arrangement. This cold working of the cover includes a rollback which engages the outer peripheral gasket. The cold worked cover has high strength enabling it to continuously press the seal tightly against the outer cell housing. Such a seal has been found effective and desirable.

Unfortunately, cold worked steel and the like is highly subject to corrosion. The work hardened metal in areas highly cold worked and not cathodically protected is subject to excessive corrosion such as when the external cover surface is exposed to high humidity or other environments tending to naturally cause corrosion. Excessive rusting of the external cover surfaces is observed, for example, when cells are stored in high humidity test cabinets.

Conceivably the highly cold worked metal could be annealed and thereby rendered resistant to corrosion. However, that was not possible because the annealing process would reduce the yield point and the elastic deformation or recovery of the rollback. This in turn would reduce the radial displacement of the tangential spring of the unit and thereby reduce the ability of the resulting seal to remain leak free over its wide temperature range.

SUMMARY OF THE INVENTION

The present invention makes possible the use of an annealed cell cover even in the complex geometric design similar to that disclosed in the copending application Ser. No. 102,814, formed by being highly cold worked, yet with attendant corrosion resistance. This is achieved by employing an annealed cover, annealed after the cold working process, in combination with a ring of high yield strength material inside the cell. This ring and the annealed cover are in interference fit so that additional compression is provided to the seal area. The ring itself is cathodically protected when the cover assembly is connected to the anode of the cell. Moreover, the annealed cover exposed to external atmosphere resists corrosion due to its annealed characteristic. The compression ring is of a high yield strength material. This ring can be a precipitation hardened metal alloy such as 17-7 PH or 17-4 PH stainless steel. Alternatively, the ring can be of a copper-beryllium alloy, or a 4340 alloy steel which has been cold worked. Any of these should be heat treated to obtain a yield strength much higher than that of the annealed cover, preferably 175 to 280 ksi (ksi = 1000 psi). In comparison, a work hardened 304 stainless steel cover as in the prior application would have a yield point of about 100 to 150 ksi. Other suitable materials for the ring could include ceramics, metal carbides such as titanium carbide, tungsten carbide, etc., reinforced plastics or composite structures, provided they had a high yield strength substantially greater than the annealed cover. Such a combination structure can exhibit greater elastic radial displacement capabilities than the prior rollback cover configuration and therefore have even better sealing characteristics over a wider temperature range. As noted previously, the metal ring will be cathodically protected when the cover assembly is connected to the anode of the cell, so as to not constitute an internal corrosion problem. The annealed metal cover can be, for example, of 304L stainless steel or nickel plated steel, to resist corrosion. The cover configuration is thus an annealed cover with basically the same outside diameter as the prior rollback cover, the high compression ring being press fitted therewithin and positively retained in place by crimping the bottom edge of the cover.

Further, rather than the cover having the specific configuration as set forth in the drawings, the combination can employ a cover which is significantly cold worked into other configurations and subsequently annealed.

BRIEF DESCRIPTION OF THE DRAWING

The FIGURE is a greatly enlarged side elevational sectional view of a cell employing this invention.

DESCRIPTION OF THE PREFERRED EMBODIMENT

Figure 1:
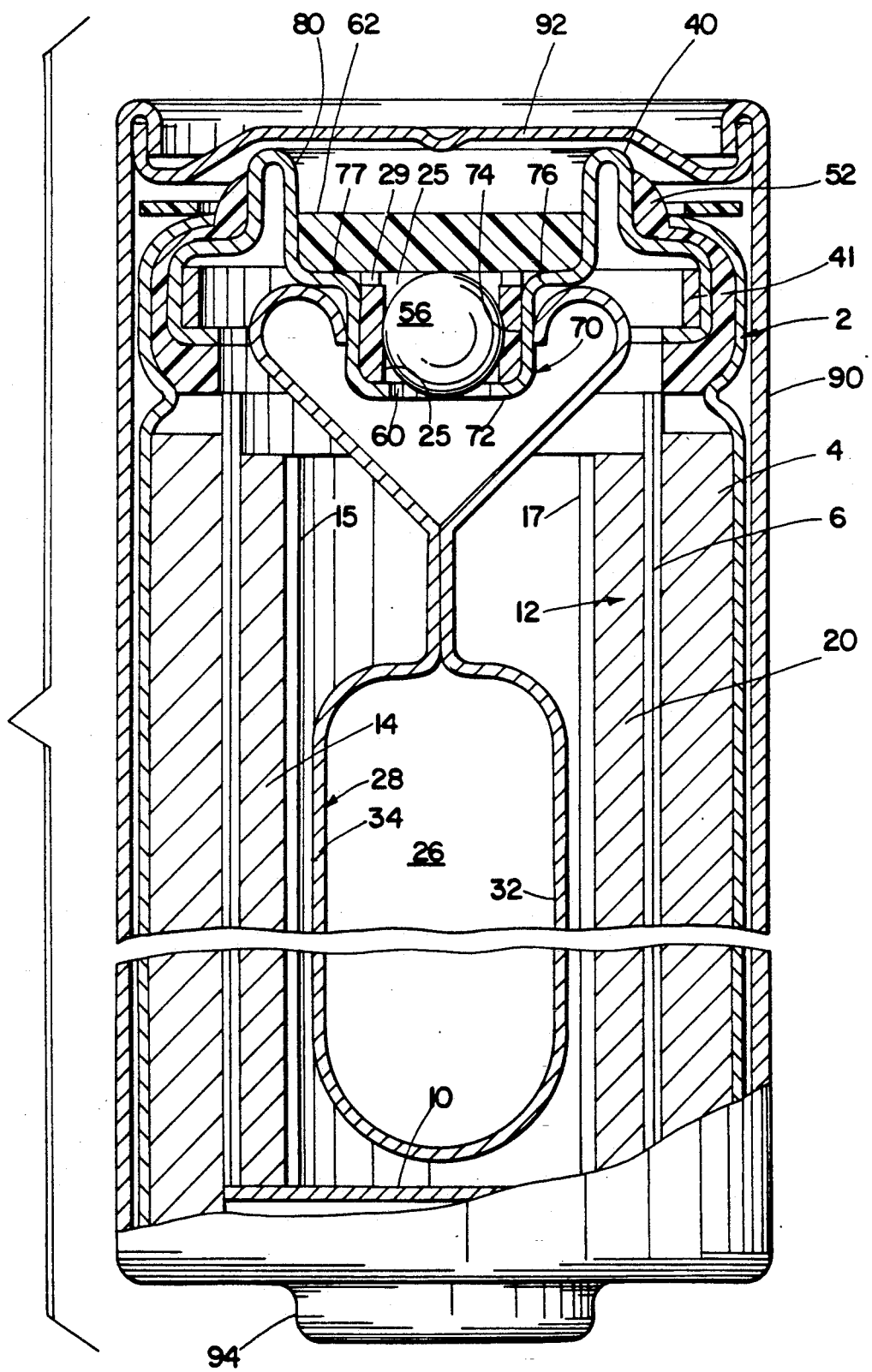

Referring to FIG. 1, there is shown a cross sectional view of a cylindrical nonaqueous electrochemical cell comprising an anode, a cathode collector and a liquid cathode-electrolyte.

The cathode-electrolyte may comprise a solution of an ionically conductive solute dissolved in a liquid active cathode material. The cathode material can be a liquid oxyhalide of an element of Group V or Group VI of the Periodic Table, such as sulfuryl chloride, thionyl chloride, phosphorus oxychloride, thionyl bromide, chromyl chloride, vanadyl tribromide and selenium oxychloride. Also usable as a cathode material is a halide of an element of Group IV to Group VI of the Periodic Table, such as sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, tin bromide trichloride, tin dibromide dichloride and tin tribromide chloride.

The solute for use in the cathode-electrolyte can be a simple or double salt which will produce an ionically conductive solution. Preferred solutes for nonaqueous systems are complexes of inorganic or organic Lewis acids and inorganic ionizable salts. Typical Lewis acids suitable for use in conjunction with liquid oxyhalide cathode depolarizers include aluminum fluoride, aluminum bromide, aluminum chloride, antimony pentachloride, zirconium tetrachloride, phosphorus pentachloride, boron fluoride, boron chloride and boron bromide. Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

If desired, and specifically for the halides, a cosolvent can be added to the cathode-electrolyte to alter the dielectric constant, viscosity or solvent properties of the solution to achieve better conductivity. Some examples of suitable cosolvents are tetrahydrofuran, 1,3-dioxolane, 3-methyl-2-oxazolidone, propylene carbonate, gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

The cell housing comprises a cylindrical cell container 2 having an open end that is closed by a cell cover 40. A cathode collector shell 4 is in contact with the inner upstanding circumference of the cell container 2, thereby adapting the container 2 as the cathodic or positive terminal for the cell. Exposed within and in contact with the inner circumference of cathode collector 4 is a separator liner 6 with a bottom separator or disk 10. If desired, the cathode collector material could be extruded within the container 2, rolled with the container material or composed of one or more segments to form a cylindrical tube when placed in the container.

An anode is preferably a two-member anode 12 comprising first and second half cylindrical members 14 and 20 having flat end faces and arranged in opposing fashion to form an axial cavity 26 therebetween.

Cathode collector shell 4 is electronically conductive to permit external electrical contact to be made with the active cathode material and also to provide extended area reaction sites for the cathodic electrochemical processes of the cell. Materials suitable for use for cathode collector shell 4 are carbon materials and metals such as nickel, with acetylene black being preferable. In addition, cathode collector shell 4, if made of a particulate material, should be capable of being molded directly within container 2 or capable of being molded into variously sized discrete bodies that can be handled without cracking or breaking. If cathode collector shell 4 is fabricated from a carbonaceous material, a suitable binder, with or without stabilizers, can be added to the cathode collector materials. Suitable binders for this purpose are vinyl polymers, polyethylene, polypropylene, polyacrylics, polystyrene and the like. Polytetrafluoroethylene would be the preferred binder for cathode collector shell 4 if the cell shown in the FIGURE were used with a liquid oxyhalide cathode. The binder, if required, should be added in an amount between about 5% and about 30% by weight of the molded cathode collector shell 4, since an amount less than 5% would not provide sufficient strength to the molded body, while an amount larger than 30% would wetproof the surface of the carbon and/or reduce the available surface of the carbon, thereby reducing the activation site areas available for the cathodic electrochemical process of the cell. Preferably, the binder should be between 10% and 25% by weight of the cathode collector shell 4. The materials selected for cathode collector shell 4 are to be chemically stable in the cell in which they are to be used.

Anode 12 is a consumable metal and can be an alkali metal, an alkaline earth metal, or an alloy of alkali metals or alkaline earth metals with each other and other metals ("alloy" as used herein includes mixtures, solid solutions such as lithium-magnesium, and intermetallic compounds such as lithium monoaluminide). The preferred materials for anode 12 are the alkali metals, particularly lithium, sodium and potassium. For the cell shown, it is particularly preferred to make anode 12 of lithium, in conjunction with a liquid cathode of sulfuryl chloride, thionyl chloride, or mixtures thereof.

If desired, arcuate type backing sheets 15 and 17 can be disposed against the inner surface wall of the anode to provide uniform current distribution over the anode. This will result in a substantially uniform consumption or utilization of the anode, while also providing a substantially uniform spring pressure over the inner wall surface of anode 12.

Cylindrical cover 40 has a central, cylindrical vent liner containment section 70, with a central circular orifice 60 at the lower end surrounded by a circumferential support ledge 72. Vent liner containment section 70 also comprises cylindrical sealing well 74 and rounded containment section shoulder 76. Ledge 72 is integrally joined to sealing well 74 at the bottom of sealing well 74, and is inwardly directed throughout its circumference toward the geometric axis of sealing well 74, thereby defining orifice 60. Rounded containment section shoulder 76 is located at the intersection of the top of sealing well 74 and cover ledge 77, the latter being the horizontal surface spanning the area between shoulder 76 and cap section 80. Rounded containment section shoulder 76 provides a smooth transition at that intersection without sharp edges.

Cylindrical vent liner 29, which has a vent liner orifice 25 connecting its two circular ends, is positioned in cover 40 so that one of its ends abuts support ledge 72 and its cylindrical surface is in contact with the inner surface of sealing well 74. While it is preferred that support ledge 72 be continuous about the circumference of sealing well 74 so as to minimize the potential for an undesired electrochemical cell system arising between the inside of the cell and atmospheric constituents, support ledge 72 can also comprise one or more inwardly projecting tabs or segments sufficient to provide a ledge against which vent liner 29 can abut.

Vent liner 29 can be formed from 1) a sheet material molded to shape during the process of force-fitting a seal member into the orifice of vent liner 29, or 2) a tube fabricated to a suitable length, the latter being preferred. The material from which vent liner 29 is made can be resilient or nonresilient, but must be both resistant to attack by the electrolyte and not react with a seal member force-fitted therein so as to substantially alter the pressure at which the force-fitted seal member is ejected from the vent liner 29. It is presently preferred that vent liner 29 be a molded vent liner of Tefzel®, available from E. I. DuPont de Nemours & Co., Wilmington, Del., although other materials are suitable, such as polyethylene, polytetrafluoroethylene, perfluoroalkoxy polymer, fluorinated ethylene-propylene polymer, glasses, etc.

Seal member 56 is force-fitted into vent liner orifice 25 to seal the cell. This seal member preferably has a smooth spherical configuration, as exemplified by ball 56 in FIG. 1. Ball 56 can be made of a resilient or nonresilient material such as metal, glass, ceramic, or plastics, and is made of a material or coated with a material that is chemically resistant to the cell components, particularly the liquid components. If ball 56 is resilient, it can be made from polytetrafluoroethylene, fluorinated ethylene-propylene copolymer, perfluoroalkoxy polymer, ethylene-tetrafluoroethylene copolymer or other selected fluoropolymers. When ball 56 is to be coated with a chemically inert material, it can then be made of any material.

Steel cover 40 is formed by a series of cold working steps such that it is highly cold-worked when its final configuration is obtained. Then it is annealed to achieve good corrosion resistance in sharp contrast to the cold worked prior cover. Further, it does not need the outer edge to be turned up through the 180° formation previously used. Between the outer surface of outer cylindrical depending wall of cover 40 and the inner wall of container 2 is annular resilient gasket 52.

Press fitted into cover 40 is a hardened high yield strength compression ring 41. Cover 40 is then in compressive engagement with gasket 52 and with the inner surface of the open end of container 2. The compression ring has a strength in the range of 100 to about 280 ksi and is preferably formed of a hardened metal alloy such as 17-7 PH (UNS No. S 177000) or 17-4 PH (UNS No. S 174000) stainless steel, or a copper-beryllium alloy or beryllium-nickel alloy, or a 4340 alloy steel. Other suitable materials of comparable strength could conceivably be employed, e.g., metallic carbides or cermets of various forms, etc. After the ring is fitted into the cover outer rim, at least portions of the lower edge of the cover rim may be bent radially inwardly beneath the ring, if desired. When this high strength ring is fitted into the cover, it supplies radially outward compression. When the open end of container 2 is crimped radially inwardly against annular resilient gasket 52, the seal is forced tightly into sealing engagement with the outwardly compressed flange of cover 40. Thus, the cell is tightly sealed even though the cover is annealed and has excellent corrosion resistance, and the cover is easier to fabricate.

An electrically conductive spring strip 28, whose legs 32 and 34 are biased against the anode members, is electrically connected to cell cover 40 so as to make cover 40 the anodic or negative terminal of the cell. The ends of spring legs 32 and 34 can be electrically connected to cover 40 by welding the ends to cover 40. Alternatively, the geometric configuration of cell cover 40 may use the connection system in application Ser. No. 102,814, filed Sept. 25, 1987.

To fabricate the cell illustrated in the FIGURE, a stainless steel strip having a smooth surface finish is subjected to a blanking operation, which cuts out a flat disc of a size sufficient so that cover 40 can be drawn from it. The disc is then drawn into a cup shape and a cover flange is formed.

Vent liner containment section 70 and annular cap section 80 are next formed in the partially formed cover by a drawing operation. To prevent cracking during drawing, it is preferred that this drawing operation be performed in a number of steps, each successively drawing cover 40 closer to its final form. Cover orifice 60 is then formed in a punching (or drilling) operation. Alternatively the containment section 70 may be formed first in the drawing operations.

The foregoing drawing operations will affect somewhat the smooth surface finish of the steel. Generally, the finish will remain sufficiently smooth such that subsequent insertion of vent liner 29 into sealing well 74 can be performed in a way that yields intimate contact between them. However, if desired, additional finishing operations may be carried out to further smooth the sealing surface.

The cold-worked cover is then annealed to markedly increase its resistance to corrosion. The annealing time and temperature can vary depending on the cover size and the number of pieces. Specific annealing conditions are not believed critical, with temperatures in the range of about 1000° to about 1100° C., and times between about 10 minutes to 60 minutes being considered typical. The resulting yield strength of the annealed cover can be about 35 to 45 ksi (ksi is 1000 psi).

Cylindrical vent liner 29 preferably has an outside diameter slightly larger than the inside diameter of cylindrical sealing well 74 so that vent liner 29 can be press-fitted into sealing well 74 to yield an interference fit. In a present embodiment, a vent liner 29 having an outside diameter of 0.135 inch is press-fitted into a sealing well 74 having an inside diameter of 0.125 inch.

Vent liner 29 is inserted into sealing well 74 until the bottom of vent liner 29 abuts support ledge 72. In this way, support ledge 72 provides a positive stop against which vent liner 29 cannot be further inserted, thereby eliminating the need for any flange at the top of the vent liner. In addition, the interference fit causes the outer surface of vent liner 29 to be strongly forced against the inner surface of sealing well 74, which causes intimate contact between those two surfaces, thereby effectively preventing ionic transport from the inside to the outside of the cell via the interface between vent liner 29 and sealing well 74. Since containment section shoulder 76 is rounded, insertion of liner 29 is made easier, and the potential for scoring the liner during insertion is minimized. It is preferred that the length of vent liner 29 be such that, when inserted in sealing well 74, the upper circular end of vent liner 29 is flush with cover ledge 77.

It is also preferred for oxyhalide cells that sealing well 74 be coated with a sealant prior to insertion of liner 29. Such a sealant more completely insures the sealing of liner 29 to sealing well 74 in the event of possible imperfections on the surface of liner 29 or sealing well 74. The sealant can be a halocarbon grease or wax, which is a saturated low-molecular weight polymer of chlorotrifluoroethylene, or a fluoroelastomer. Alternatively, since Tefzel® is heat bondable, vent liner 29, when made of this material, can be sufficiently heated prior to or after insertion into sealing well 74 and press bonded therein.

After insertion of vent liner 29 into sealing well 74, spring collector assembly 28 is pressed onto the cylindrical outside of sealing well 74, and cover 40 is inserted into its proper location inside annular gasket 52. Gasket 52 is located at the open end of cell container 2. It is preferred that gasket 52 be made of Tefzel® and coated with a sealant of the same type preferably used to coat sealing well 74. At the time cover 40 is inserted into annular gasket 52, container 2 has already been supplied with a cathode collector shell 4, a separator liner 6 and bottom separator 10, an anode 12, and backing sheets 15 and 17. As cover 40 is positioned with respect to gasket 52, the legs 32, 34 of the spring strip 28 are squeezed together and forced into the axial opening between the two screen-backed anode members 14 and 20, as shown in FIG. 1. The inserted spring strip 28 resiliently biases the two anode members via backing screens 15 and 17 so as to provide substantially uniform and continuous pressure contact over the inner wall of the anode members.

After inserting cover 40 inside basket 52, the cell is closed and sealed using conventional closing techniques, so that cell container 2 and cell cover 40 make up a sealed cell housing. The cell is then filled with cathode-electrolyte through the vent opening in sealing well 74.

After the container is filled with cathode-electrolyte, seal member 56 is disposed over vent liner orifice 25 in liner 29, and a ram member is used to force seal member 56 into orifice 25 until further insertion is resisted because of the presence of support ledge 72. After removal of the ram, a layer of sealant 62 is disposed over seal member 56, vent liner 29 and extended onto cover ledge 77 to produce a fully sealed cell. Suitable sealing materials include halocarbon wax, asphalt, or any other material that is resistant to moisture, has reasonable adhesion to metal and is applied easily. Preferably, the sealant material should be applied in liquid form and then allowed to solidify. The cell is then finished by encasing it in a conventional steel outer jacket 90 which is coated on its inner surface with a nonconductive liner. Finishing covers 92 and 94 then complete the outer cell enclosure.

It is to be understood that the improved vent liner and cover construction of this invention could be used in connection with other cells such as, for example, LeClanche dry cells, zinc chloride cells, lithium-$MnO_2$ cells, lithium-iron sulfide cells, alkaline $MnO_2$ cells, nickel-cadmium cells, and lead-acid cells. It is also conceivable that the details of the preferred exemplary embodiment depicted could be modified to suit particular cells. It is not intended that the invention is to be limited by the exemplary cell described, but only by the scope of the appended claims and the reasonable equivalents thereof.

The embodiments of the invention in which an exclusive property or privilege is claimed are defined as follows:

1. An electrochemical cell employing a complex cover that has been highly cold worked but is resistant to corrosion, comprising:
   a cell housing containing the chemically active components of the cell;
   said housing having an open end;
   a cold worked and subsequently annealed metal cover over said open end;
   said cover including a vent well containing a vent seal member therein;
   said cover having an outer wall including a vertically extending rim;
   said rim including an outer face and an inner face;
   a sealing gasket between said outer rim face and said housing;
   a compression ring of high yield strength material;
   said compression ring being in radially outwardly compressive engagement with said rim inner face to retain said outer rim face of said annealed cover in firm engagement with said gasket and thereby tightly seal said gasket against said housing.

2. The electrochemical cell in claim 1 wherein said compression ring is a precipitation hardened metal alloy.

3. The electrochemical cell in claim 2 wherein said cover is of stainless steel.

4. The electrochemical cell in claim 2 wherein said compression ring has a yield strength of about 100 to about 280 ksi.

5. The electrochemical cell in claim 4 wherein said compression ring has a yield strength of about 175 to 280 ksi.

6. The electrochemical cell in claim 4 wherein said annealed cover has a yield strength of about 35 to 45 ksi.

7. The electrochemical cell in claim 1 wherein said cover includes a horizontally inwardly extending annular peripheral ledge integral with said rim; and said compression ring being supported on said ledge.

8. An electrochemical cell employing a complex cover that has been highly cold worked but is resistant to corrosion, comprising:
   a cell housing containing the chemically active components of the cell;
   said housing having an open end;
   a cold worked and subsequently annealed metal cover over said open end;
   said cover having an outer wall including a vertically extending rim including an outer face and an inner face;
   a sealing gasket between said outer rim face and said housing;
   a compression ring of high yield strength material press fitted into said rim in radially outwardly compressive engagement with said rim inner face to retain said outer rim face of said annealed cover in firm engagement with said gasket and tightly seal said gasket against said housing.

9. The electrochemical cell in claim 8 wherein said compression ring is a precipitation hardened metal alloy.

10. The electrochemical cell in claim 8 wherein said cover is of stainless steel.

11. The electrochemical cell in claim 8 wherein said cover includes a vent well containing a vent seal member therein.

12. The electrochemical cell in claim 8 wherein said compression ring has a yield strength of about 100 to about 280 ksi, and said cover has a yield strength of about 35 to 45 ksi.

13. The electrochemical cell in claim 12 wherein said compression ring is of a precipitation hardened metal alloy.

* * * * *